UNITED STATES PATENT OFFICE.

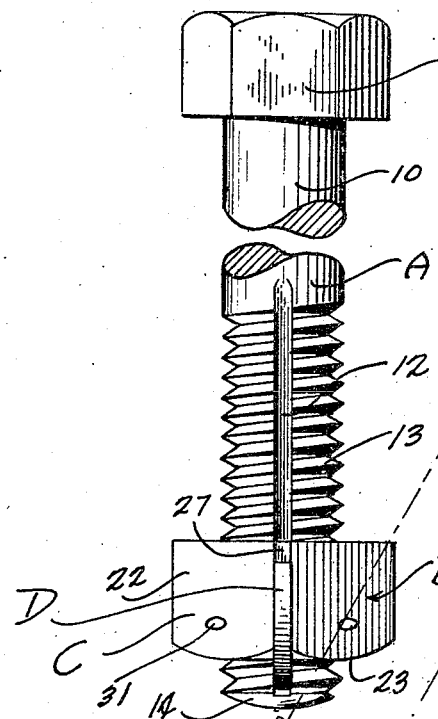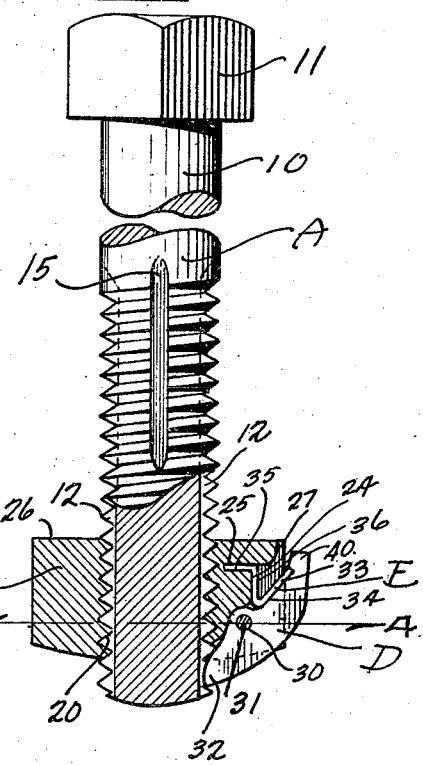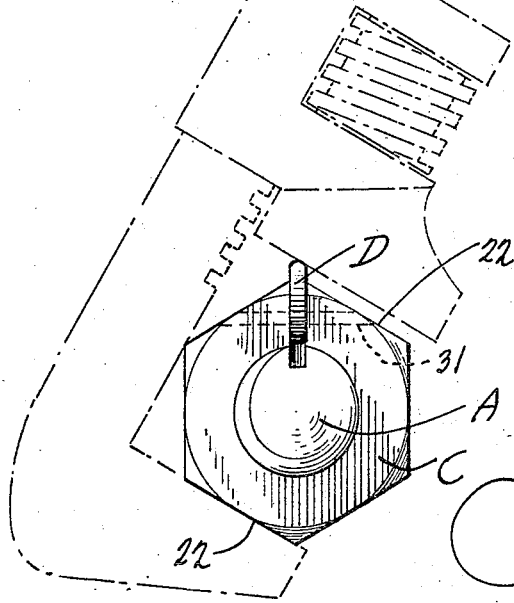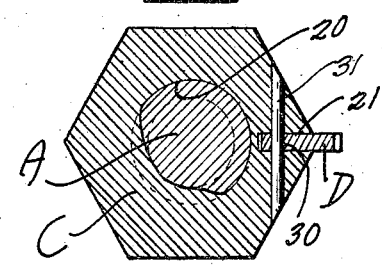

GEORGE HENRY THAMANN, OF COVINGTON, KENTUCKY.

LOCK BOLT AND NUT.

1,414,761.         Specification of Letters Patent.         Patented May 2, 1922.

Application filed March 10, 1921. Serial No. 451,386.

*To all whom it may concern:*

Be it known that I, GEORGE H. THAMANN, a citizen of the United States, residing at Covington, in the county of Kenton and State of Kentucky, have invented certain new and useful Improvements in Lock Bolts and Nuts, of which the following is a specification.

This invention relates to improvements in lock bolts and nuts.

The primary object of the invention is the provision of a lock nut for use in connection with a bolt of special formation, whereby said nut may be securely locked in any determined position upon the bolt without liability of rupture of any of the parts of said nut or bolt, and preventing accidental detachment of the nut from the bolt.

A further object of the invention is the provision of a lock nut which is extremely simple in formation, necessitating a minimum of parts, very durably constructed, and providing an inexpensive structure, which can be manufactured at a cost not to exceed that of the ordinary castle nut; and which will, to a great extent, do away with the castle nut arrangement, inasmuch as greater security and a less troublesome arrangement is provided with the improved bolt and lock nut, doing away with the cotter pin arrangement on the ordinary castle nut, which in many instances is ineffective in maintaining a nut upon a bolt.

Other objects and advantages will be apparent during the course of the following detailed description.

In the accompanying drawing, forming a part of this specification, and in which similar reference characters designate corresponding parts throughout the several views:

Figure 1 is a side elevation of the improved bolt and lock nut structure.

Figure 2 is a side elevation of the improved bolt and lock nut structure, showing details in cross section.

Figure 3 is a bottom plan view of the improved lock nut structure assembled to a bolt, and showing the operating relation of the same to an adjusting wrench.

Figure 4 is a cross sectional view taken on the line 4—4 of Figure 2.

In the drawing, wherein for the purpose of illustration is shown a preferred embodiment of my invention, the letter A designates a bolt of the improved type, having the improved lock nut B mounted thereon, and which lock nut B includes the standard type of nut C, altered to a certain extent to receive a locking pawl D; normally urged into locking relation with the bolt A, by a spring E.

The bolt A can of course, be manufactured to suit the particular purpose for which the same is required, and includes the shank 10 having the head 11 integrally mounted thereon as in ordinary bolt construction. The bolt A, however, is of special construction, in that longitudinal grooves 12 are provided in the shank 10, and extending through the screw threaded portion 13 thereof, said grooves being of sufficient depth to be disposed immediately below the root of the screw threads. It is preferred, that the grooves 12 extend entirely through the screw threaded portion 13 of the shank and open out upon the end 14 of the bolt. The grooves 12 are provided at diametrically opposite points upon the shank 10. Grooves 15 are provided in the screw threaded portion 13 of the shank 10 at an angle of 90° to the grooves 12, being diametrically opposed upon said shank, and extending but a distance substantially one-half of the screw threaded portion 13, and upon the upper part thereof, for a purpose to be subsequently set forth.

The nut C is of ordinary polygonal formation, being uniform in transverse cross section, throughout the depth thereof, and provided, as in ordinary construction, with the screw threaded bore 20, as in ordinary construction adapted to receive the shank 10 of the bolt. A slot or recess 21 is provided in the nut C, of uniform width, and which is cut into the nut C at the point of juncture of two of the sides 22 of the nut. The slot 21, extends the entire distance through the nut C upon the forward part 23 thereof, and thus communicates with the bore 20. From the forward part 23 of said nut, the slot or recess 21 inclines upwardly to provide a shelf 24, rearwardly of which shelf is a depending aperture 25, adapted to receive an end of the spring E which will be subsequently set forth. The slot 21 abruptly terminates upon the rear 26 of the nut B in a shoulder 27.

The locking pawl D is of special construction, and provided with an aperture 30, adapted to receive a pin 31, said pin being disposed within suitable apertures in the nut C, and which communicate from one face 22 to the other face 22, as a means to facilitate entry of the pin 31 for pivotally supporting said locking pawl D. The pawl D is of sufficient width to be comfortably operated within the slot 21, and has an end 32, called the locking point, which is normally forced into the screw threaded bore 20 of the nut C by the resilient end 33 of the spring E, which engages in a suitable notch 34 formed upon the under surface of the locking pawl.

The spring E is preferably of some high grade type of spring steel, and has an end 35 rigidly mounted in the aperture 25 of the nut C, and provided with an intermediate portion 36 resting upon the shelf 24 of said nut C, and having the resilient end 33 bent integral upon said intermediate portion 36, and as heretofore mentioned normally engaging the notch 34 of the locking pawl D.

From the foregoing description, it can be seen that a locking pawl D has been provided, in which the locking point 32 is normally forced into the bore 20 of said nut C by the resilient spring E. The pawl D is of sufficient formation that an end 40 is adapted to engage the shoulder 27 of the nut C, when the point 32 is raised from its communication in the bore 20.

The operation of the improved lock nut B is effected in the same manner as the standard type of nut, and may be effected by an ordinary oversized spanner wrench, or the ordinary type of adjustable monkey wrench, illustrated in dot and dash lines in Figure 3 of the drawing. When the wrench has been applied to opposite faces 22 of the nut C, a jaw of the wrench engages the portion of the locking pawl D projecting from the slot 21, and upon adjustment of the jaws of said wrench, the locking pawl D will be rocked upon its pivot pin 31, thus lifting the locking point 32 out of the bore 20, and said nut C can be rotated freely upon the shank 10 of the bolt A. When the desired clamping action has been secured against any work it is desired to clamp intermediate the bolt A and the head 11, the wrench can be released by readjustment of the jaws, and the spring E acting upon the locking pawl D will rock the same upon the pivot pin 31 until the locking point 32 engages within a groove 12 or 15.

It is preferred to provide the said grooves 15, inasmuch as they will be used in cases where a very fine adjustment of the nut is desired, and it can readily be seen that the nut C can be locked in any position upon the screw threaded portion 13 at each quarter turn thereof. The grooves 12 extend entirely through the screw threaded portion 13 in order that the nut C will not become detached when said nut is positioned at any place upon the shank. Since the nut C will be positioned for a considerable distance upon the shank 10 before the same engages a piece of work, the groove 15 is not extended entirely through to the end 14 of the bolt.

Various changes in the shape, size and arrangement of parts may be made to the form of my invention herein shown and described, without departing from the spirit of the invention or the scope of the claims.

I claim:

1. A lock nut of hexagonal formation having a screw threaded aperture centrally therein and provided with a slotted opening diagonally therein extending from the juncture point of adjacent sides and toward the center of said nut, a pawl pivoted in said slot, and spring means in said slot for normally forcing one end of said pawl toward the screw threaded opening in said nut, said spring forcing the other end of said pawl to project from the juncture point of the adjacent sides in which said slot is formed, in such manner that a wrench may be used on said nut for engaging the spring forced end of said pawl projecting from the juncture point of said nut and to rock the other end of said pawl outwardly and away from the screw threaded opening in said nut for disconnecting the nut from a bolt.

2. A nut lock comprising a hexagonal nut body provided with a screw threaded aperture therein and diagonally slotted from a juncture point of adjacent sides and toward the axis of said nut, said slot sloping from the inside toward the outside face of said nut, a pin pivotally mounted through said nut from one face of said bolt adjacent said slot and to extend through the other face adjacent said slot, said pin extending through said slot, a pawl pivotally mounted on said pin to have the forward lock end thereof to project from the outer face of said nut and extending toward the axis of said nut, a flat spring secured in said slot and having a resilient end thereof engage the end of said pawl opposite its locking end, whereby said end projects outwardly from the planes of the sides of said nut adjacent said slot, and in such manner that a wrench may be used on said nut for engaging said projecting end of the pawl and to rock the locking end of said pawl outwardly and away from the axis of said nut.

GEORGE HENRY THAMANN.